(12) United States Patent
Feld et al.

(10) Patent No.: US 8,176,116 B2
(45) Date of Patent: May 8, 2012

(54) OPERATING METHOD FOR AN AUTOMATION UNIT

(75) Inventors: Joachim Feld, Nuremberg (DE); Guenter Steindl, Trasslberg (DE)

(73) Assignee: Siemens Aktiengesellschaft, Munich (DE)

( * ) Notice: Subject to any disclaimer, the term of this patent is extended or adjusted under 35 U.S.C. 154(b) by 2120 days.

(21) Appl. No.: 10/243,950

(22) Filed: Sep. 16, 2002

(65) Prior Publication Data

US 2003/0056021 A1 Mar. 20, 2003

(30) Foreign Application Priority Data

Sep. 14, 2001 (EP) .................................... 01122134
Oct. 10, 2001 (EP) .................................... 01124151

(51) Int. Cl.
*G06F 15/16* (2006.01)
(52) U.S. Cl. ........................................ 709/203; 709/217
(58) Field of Classification Search .................. 709/203, 709/217–219; 719/313
See application file for complete search history.

(56) References Cited

U.S. PATENT DOCUMENTS

| | | | |
|---|---|---|---|
| 6,314,447 B1 * | 11/2001 | Lea et al. | 718/105 |
| 6,792,605 B1 * | 9/2004 | Roberts et al. | 719/313 |
| 2002/0046239 A1 * | 4/2002 | Stawikowski et al. | 709/203 |
| 2002/0143819 A1 * | 10/2002 | Han et al. | 707/513 |
| 2003/0204622 A1 * | 10/2003 | Blizniak et al. | 709/241 |
| 2004/0054690 A1 * | 3/2004 | Hillerbrand et al. | 707/104.1 |

FOREIGN PATENT DOCUMENTS

| | | |
|---|---|---|
| EP | 732 834 A2 | 9/1996 |
| EP | 733 968 A2 | 9/1996 |
| FR | 2813471 A1 * | 3/2002 |
| WO | 00/77618 A2 | 12/2000 |

OTHER PUBLICATIONS

Web Services Description Language (WSDL) 1.1, Mar. 15, 2001.*
Mark Betz, Dr. Dobb's Special Report; "OMG's COBRA", Winter 1994/95 vol. 19, No. 16, Dec. 21, 1994, pp. 8-12.
IBM Technical Disclosure, Bulletin, vol. 37, No. 7, Jul. 1994, pp. 539-542.

* cited by examiner

*Primary Examiner* — Yasin Barqadle
(74) *Attorney, Agent, or Firm* — Staas & Halsey LLP

(57) ABSTRACT

A potential communication partner receives an inquiry which prompts it to notify the inquiring party of its interface in machine-readable form. When the interface data for the potential communication partner are available, the interface data can be transferred to a program, and communication with the remote partner can be started, the communication including a request for a functionality which is provided by the remote partner.

14 Claims, 3 Drawing Sheets

OPERATING METHOD FOR AN AUTOMATION UNIT

CROSS REFERENCE TO RELATED APPLICATIONS

This application is based on and hereby claims priority to European Patent Application Nos. 011 221 34.8 filed on Sep. 14, 2001 and 011 241 51.0 filed on Oct. 10, 2001, the contents of which are hereby incorporated by reference.

BACKGROUND OF THE INVENTION

The invention relates to an operating method for an automation unit which is communicatively linked to at least one further automation unit. The communicative link existing between them means that the two automation units and software applications (programs) running thereon are communication partners in a communication session.

So that two communication partners, referred to below as partners for short, can communicate with one another over a communication link of whatever type, they need to know not only the respective communication protocol but also the respective interfaces, what interface the partner uses to receive data or to output data, and in what format these data are available.

To distinguish between the communication partners involved, a communication partner providing a functionality is referred to below as a server, and a communication partner requesting a functionality is referred to as a client.

A simple example of the general problem situation is, by way of example, a server providing an arithmetic application having the "adding" functionality under the function "add" (uint 32, uint 32, return uint 32). For a client for which this interface is known, the corresponding function request can be transferred to a program and the function can be requested. By contrast, this is not possible if it is not clear what functionality is provided by the remote partner, the server, and how the functionality can be retrieved.

To solve this problem, the prior art has to date provided for the respective applications, which are, by way of example, a server in a first case and a client in a second case, depending on the communication session, each to "know" the respective functionalities and the associated interfaces by assuming, by way of example, a common global variable and interface declaration, as supported by today's customary "relatively high level" programming languages, e.g. by using common variable declaration modules or interface declaration modules—the "header files" in the case of the programming language "C".

This disadvantageously requires that, for every application, data of this type can be accessed when the application is created; this cannot be ensured or can be ensured only with difficulty, particularly when the individual application is developed on a distributed basis. In addition, it is also barely possible for the functionality of a first application to be subsequently adjusted, since it must always be assumed that such a change will result in inconsistencies for other applications which use the original interface to request this functionality.

SUMMARY OF THE INVENTION

It is therefore an object of the invention to specify a communication method in which the indicated disadvantages are avoided.

This object is achieved with an operating method for an automation unit in accordance with claim 1. In this case the automation unit is communicatively linked to at least one further automation unit. The automation unit or an application (program) running thereon is referred to as a client, and the at least one further automation unit or an application running thereon is referred to as a server. In addition, the server is provided with a functionality which is to be used by the client, with information about the functionality being stored on the server. The operating method then comprises the following steps:

(a) the client sends an inquiry to the server on which the information is stored, whereupon the server transmits the information as a response to the inquiry, (b) following evaluation of the information, the client transmits a request to the server providing the functionality, (c) the server executes the functionality on the basis of the request, and (d) any result obtained when executing the functionality is transmitted from the server to the client.

If the server providing the functionality is ascertained by the client on the basis of the information obtained in step (a), it is not necessary for the client to "know" before the functionality is actually requested which other communicating parties hold the functionality. Instead, the client sends an inquiry to a central server, which is designed as such, in particular, and receives from this central server not only the information regarding what functionality is provided by the other communicating parties which can be reached, but also information regarding which communicating party provides what functionality.

If the information which the server transmits to the client comprises a designator and an interface for the functionality, and the request for the functionality is made using the designator and the interface, then even remote functionality can be used particularly transparently in the customary syntax of "relatively high level" programming languages.

If the interface comprises input and output parameters and the result corresponds to the output parameter(s), then results which have been ascertained using or by a remote functionality can be transferred without additional conversion operations to the database for the application which has requested the functionality as a client.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
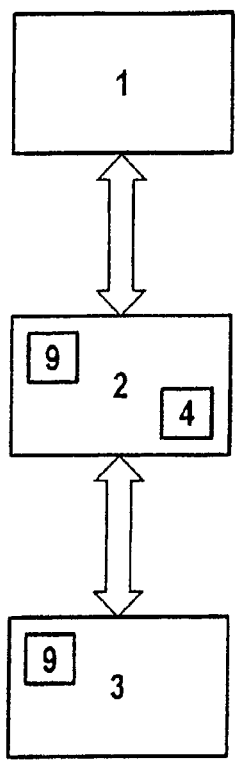
FIG. 1 is a block diagram of communication partners communicating with one another.

Reference will now be made in detail to the preferred embodiments of the present invention, examples of which are illustrated in the accompanying drawings, wherein like reference numerals refer to like elements throughout.

FIG. 1 shows first, second and third automation units 1, 2, 3 as communication partners 1, 2, 3 communicating with one another. The first automation unit 1 is referred to below as client 1, the second automation unit 2 is referred to as server 2 and the third automation unit 3 is referred to as central server 3. Client 1, server 2 and central server 3 are communicatively connected to one another directly or indirectly, as indicated by the double-headed arrows.

The rest of the description continues for the exemplary situation in which the server 2 provides at least one functionality 4 which is to be used by the client 1. Such a functionality 4 is, by way of example, a functionality which cannot be held on the client 1 on account of the storage space required or which cannot be executed, or cannot be executed in a feasible time, on account of the computation power required.

An example of such a functionality 4 is access to an extensive database (not shown) or the execution of a complex calculation, such as an optimization method, particularly an iterative optimization method. Every conceivable functionality is referred to below by the general term functionality 4.

Figure 2:
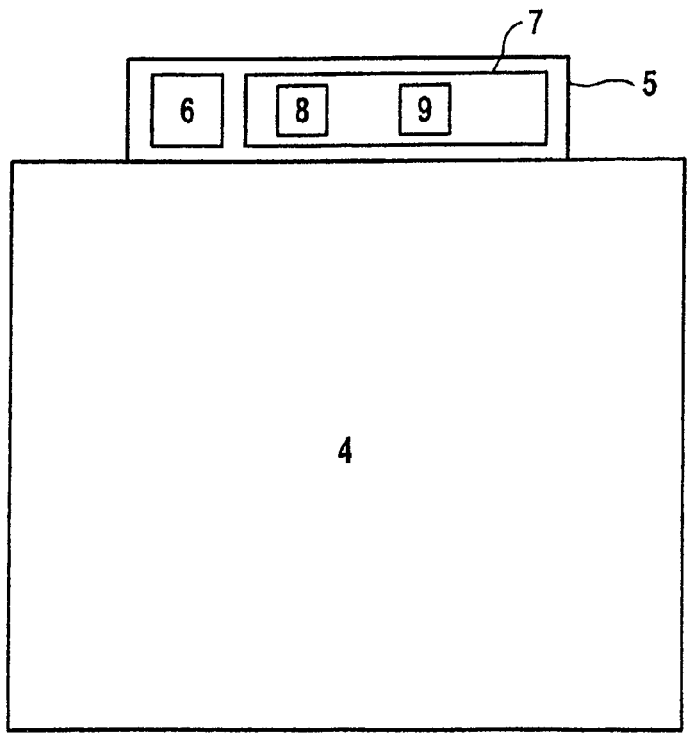
FIG. 2 is a block diagram illustrating a functionality provided by a communication partner, with the associated interface.

So that the functionality 4 which is on the server 2 can be requested by the client 1, certain information is needed about the functionality 4. To this end, FIG. 2 shows the functionality 4 provided by the server 2, with associated information 5. The information 5 comprises a designator 6 for the functionality 4 in order to be able to distinguish clearly between a first functionality 4 and a second functionality 4. Furthermore, this includes an interface 7 which is associated with the functionality 4 and which contains the input and output parameters 8, 8' so that the functionality 4 can have data transferred to it as parameters, and hence the functionality 4 can return results as parameters to the client 1.

Figure 3:
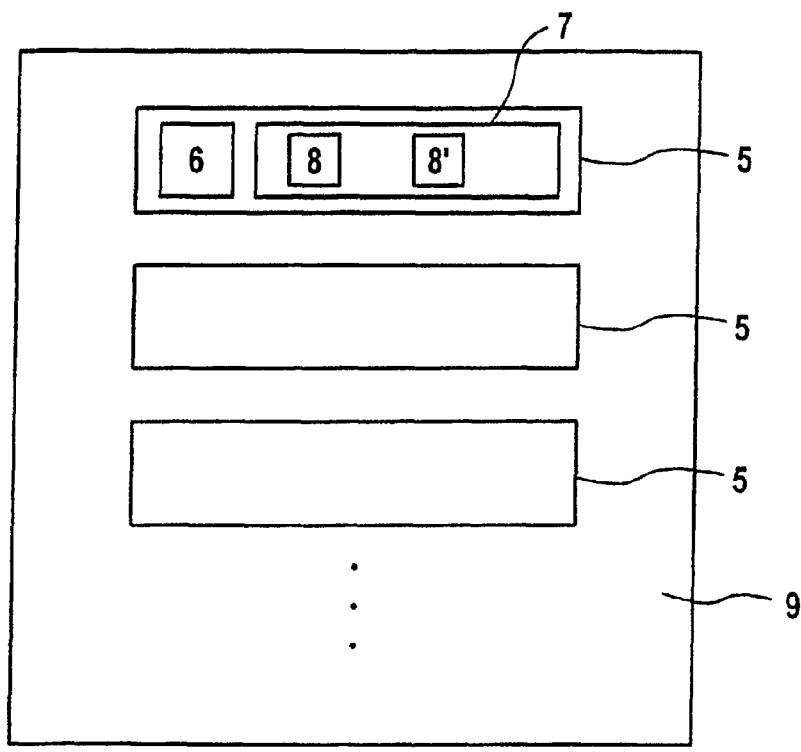
FIG. 3 is a partial file structure diagram of an information file.

FIG. 3 shows an information file 9 storing the information 5 in summarized form. The information file 9 is held, by way of example, on the server 2 or else on the central server 3. It is also possible for a respective information file 9 to be provided both on the server 2 and on the central server 3, in which case the information file 9 on the server contains, by way of example, information about frequently used functionalities 4 and the information file 9 on the central server 3 contains information about less frequently used functionalities 4.

Figure 4:
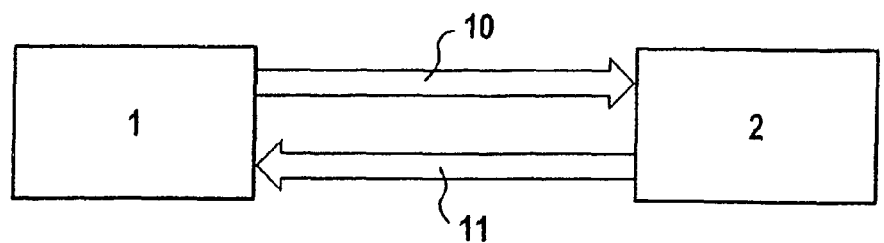
FIGS. 4-6 are block diagrams illustrating communication sessions or operations.
Figure 5:
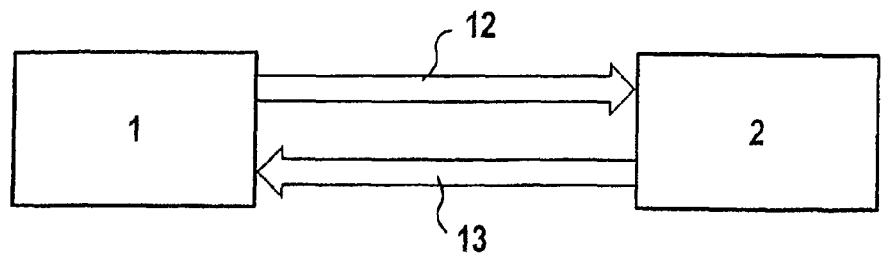

FIGS. 4 and 5 show the sequence of the method when the client 1 uses a functionality 4 provided on the server 2. FIG. 4 shows an inquiry 10 which the client 1 sends to the server 2. As a response 11 to the inquiry 10, the server 2 transmits its interface to the client 1. The interface corresponds to the content of the information file 9 on the server 2. Following receipt of the interface, the client 1 "knows" every functionality 4 provided on the server 2. In particular, the client 1 thus knows how a specific functionality 4 can be used, i.e. how this functionality 4 can be requested, the request being made using the respective designator 6, and how, i.e. in what order and in what format, parameters 8, 8' need to be transferred to the functionality 4 and in what order and in what format markers for holding any results delivered by the functionality 4 need to be provided.

FIG. 5 shows the sequence of the method for using a specific functionality 4. In this case, the client 1 transmits to the server 2 a request 12 in which the desired functionality is selected by the corresponding designator 6 and which comprises the interface 5 which is needed in order to use the functionality 4. The server 2 now uses the data 6, 7, 8, 8' in the request 12 to execute the requested functionality 4 and returns any result 13 to the requesting client 1.

The sequence of the method shown in FIGS. 4 and 5 can also be cascaded. It is thus possible, for example, for a client 1 to send to the server 2 an inquiry 10 which cannot initially be handled by the server 2. The server 2 then itself acts as a client and forwards the inquiry to a further server (not shown) until a server is found which reacts to the inquiry and returns a response 11. This response 11 is returned to the original client 1 along the cascade which is produced. The response 11 either directly comes from the server 2 which can execute the functionality 4, so that a request 12 for the functionality can be sent directly to server 2, or the request 12 is passed through the cascade, so that finally the server (not shown) which can execute the functionality is reached. In both cases the server 2 finally returns the result 13 to the requesting client 1, either directly or via the cascade.

Figure 6:
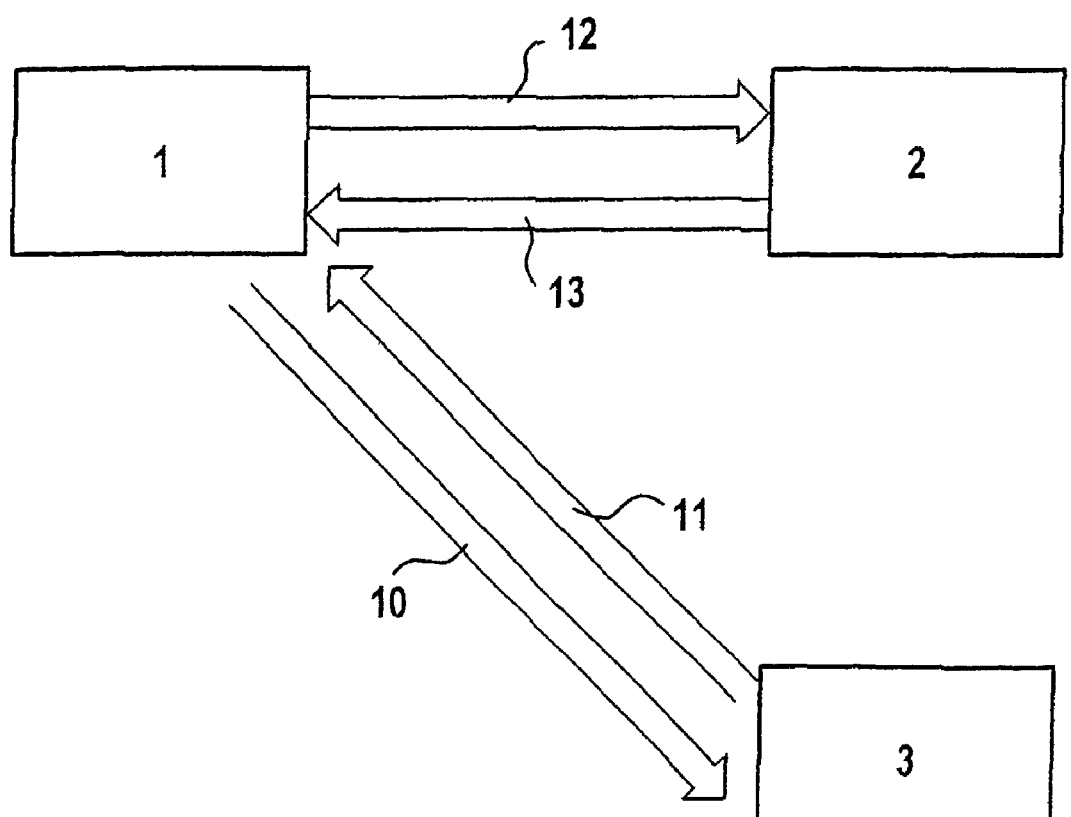

Holding the information file 9 on the server 2 requires storage space which is not always available on the server 2, or is not available to a sufficient degree. It is then possible to provide for the information file 9 not to be held, or not to be held completely, on the server 2 but rather on a central server 3. FIG. 6 shows the sequence of the method for such a situation.

As illustrated in FIG. 6, the client 1 first transmits an inquiry 10 to the central server 3. The central server 3 transmits the interface 11 (the content of the information file 9 which it stores) back to the requesting client 1. In this case, the interface 11 now comprises not only the information already described above, but also, additionally, the information regarding which automation unit 2, 3 now actually holds the desired functionality 4. The client 1 selects the desired functionality from the transmitted interface 11 and requests it using a request 12 to the automation unit 2, 3 on which the functionality 4 is held. The corresponding automation unit 2, 3 with the requested functionality returns any result 13 to the requesting client 1.

The sequence of the method shown in FIG. 6 can also be cascaded with the sequence of the method shown in FIGS. 4 and 5, which means that, when the client 1 sends an inquiry 10 to the central server 3, the central server, operating as a client (c.f. FIG. 4), now forwards the inquiry 10 to the server (not shown) which can execute the requested functionality 4, the server transmits its interface as response 11 to the inquiry 10, and the interface is finally transmitted back to the requesting client 1 by the central server 3. The request 12 for the functionality is then also made using a request 12 which is first sent to the server 2 and may forwarded to another server (not shown) by server 2 in its capacity as a client (cf. FIG. 5). The server with the functionality first returns the result 13 to server 2, from where it is finally sent to the originally requesting client 1.

In summary, the invention can be described as making provision for a potential communication partner 2, 3 to be able receive an inquiry 10 which prompts it to notify the inquiring party 1 of its interface 11 in machine-readable form, e.g. in the "XML format", directly or indirectly. An indirect notification means that the inquiring partner 1 is notified of which further partner in the network it can ask for the interface directly. When the interface data 5 for the potential communication partner 2, 3 are thus available, these data can be transferred to a program, and communication with the remote partner 2, 3 can be started, the communication including a request 12 for a functionality 4 which is provided by the remote partner 2, 3.

The invention has been described in detail with particular reference to preferred embodiments thereof and examples, but it will be understood that variations and modifications can be effected within the spirit and scope of the invention.

What is claimed is:

1. An operating method for automation units communicatively linked together, the automation units including a client and at least one server, comprising:
   sending an inquiry from the client to an informational server storing information about a functionality needed by the client;
   transmitting the information from the informational server as a response to the inquiry, the information comprising a functionality interface including an input data parameter allowing the functionality to have data transferred to the functionality and an output parameter allowing the functionality to return results and a designator distinguishing between the functionality and at least one additional functionality;
   transmitting a request from the client to a functional server providing the functionality based on evaluation of the information by the client;
   executing the functionality on the functional server in response to the request; and
   transmitting from the functional server to the client a result obtained by said executing of the functionality;
   wherein said informational server and said functional server are adapted to forward transmissions from said client to other servers and from said other servers to said client.

2. The operating method as claimed in claim 1, further comprising identifying the functional server, which is separate from the informational server, by the client based on the information obtained from the informational server.

3. The operating method as claimed in claim 2, wherein the request uses the designator and the interface.

4. The operating method as claimed in claim 1, wherein the informational server and functional server reside on a single server.

5. At least one non-transitory machine readable medium storing at least one program for controlling at least one processor to perform an operating method for automation units communicatively linked together, the automation units including a client and at least one server, said method comprising:
   sending an inquiry from the client to an informational server storing information about a functionality needed by the client;
   transmitting the information from the informational server as a response to the inquiry, the information comprising a functionality interface including an input data parameter allowing the functionality to have data transferred to the functionality and an output parameter allowing the functionality to return results and a designator distinguishing between the functionality and at least one additional functionality;
   transmitting a request from the client to a functional server providing the functionality based on evaluation of the information by the client;
   executing the functionality on the functional server in response to the request; and
   transmitting from the functional server to the client a result obtained by said executing of the functionality;
   wherein said informational server and said functional server are adapted to forward transmissions from said client to other servers and from said other servers to said client.

6. The at least one non-transitory machine readable medium as claimed in claim 5, said method further comprising identifying the functional server, which is separate from the informational server, by the client based on the information obtained from the informational server.

7. The at least one non-transitory machine readable medium as claimed in claim 6, wherein the request uses the designator and the interface.

8. The at least one non-transitory machine readable medium as claimed in claim 5, wherein the informational server and functional server reside on a single server.

9. A system of automation units communicatively linked together, comprising:
   a client to send an inquiry about a functionality needed by the client and to transmit a request for execution of the functionality based on evaluation of information about the functionality, the information including a functionality interface, said client receiving a response including an input data parameter allowing the functionality to have data transferred to the functionality and an output parameter allowing the functionality to return results and a designator distinguishing between the functionality and at least one additional functionality; and
   a first server to store the information about the functionality and to transmit the information to the client as a response to the inquiry; and
   a second server to execute the functionality in response to the request, and to transmit to the client a result obtained by execution of the functionality;
   wherein said servers are adapted to forward transmissions from said client to other servers.

10. The system as claimed in claim 9, said client ascertaining to send the request to the second server, which is separate from the first server, for execution of the functionality based on the information in the response.

11. The system as claimed in claim 10, wherein the request uses the designator and the interface.

12. The system as claimed in claim 9, wherein the first server and the second server reside on a single server.

13. An operating method, comprising:
   forwarding a transmission from a client to a first device when a second device is unable to respond to an inquiry;
   receiving a response at said client wherein said response includes an input data parameter allowing a function to have data transferred to the function and an output parameter allowing the function to return results and a designator distinguishing between the function and at least one additional function;
   forwarding a second transmission from the client to a third device when a fourth device is unable to offer the function; and
   transmitting a forwarded result from said fourth device to said client.

14. An operating method, comprising:
   sending an inquiry from a client to a first server storing information about a functionality needed by the client;
   receiving a response at said client wherein said response includes an input data parameter allowing the functionality to have data transferred to the function and an output parameter allowing the function to return results and a designator distinguishing between the function and at least one additional function;
   transmitting a request from the client to a second server providing the functionality based on evaluation of the information by the client; and
   receiving from the second server a result obtained by executing the functionality;
   wherein said first server and said second server are distinct entities and are adapted to forward transmissions from said client to other servers and from said other servers to said client.

* * * * *